A. AGUILAR.
APPARATUS FOR CLEANING LECHUGUILLA, HENEQUEN, AND ANALOGOUS FIBROUS PLANTS.
APPLICATION FILED AUG. 30, 1916.
1,277,816.
Patented Sept. 3, 1918.
4 SHEETS—SHEET 2.
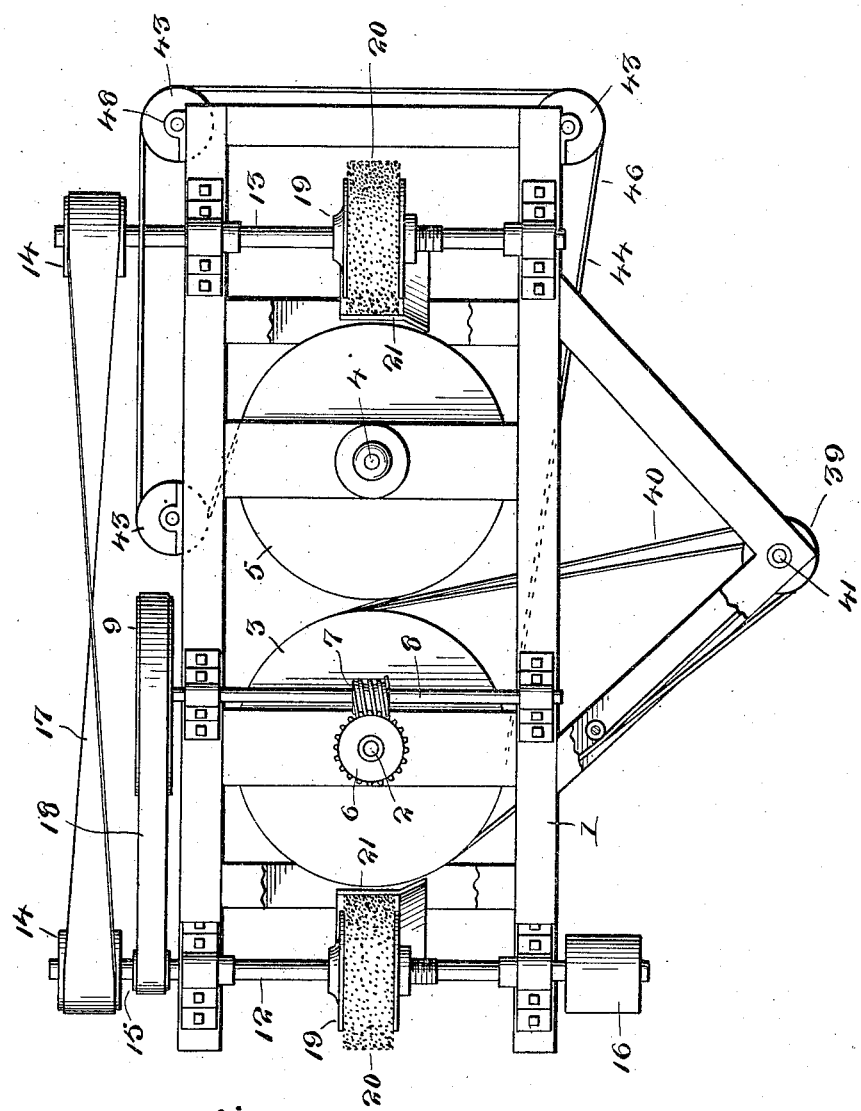
Inventor
Alfonso Aguilar
Witnesses
By Victor J. Evans
Attorney A. AGUILAR.
APPARATUS FOR CLEANING LECHUGUILLA, HENEQUEN, AND ANALOGOUS FIBROUS PLANTS.
APPLICATION FILED AUG. 30, 1916.
1,277,816.
Patented Sept. 3, 1918.
4 SHEETS—SHEET 3.
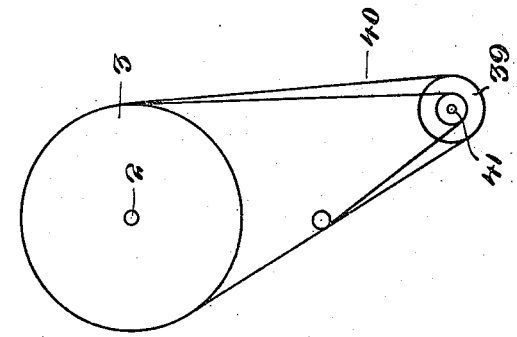
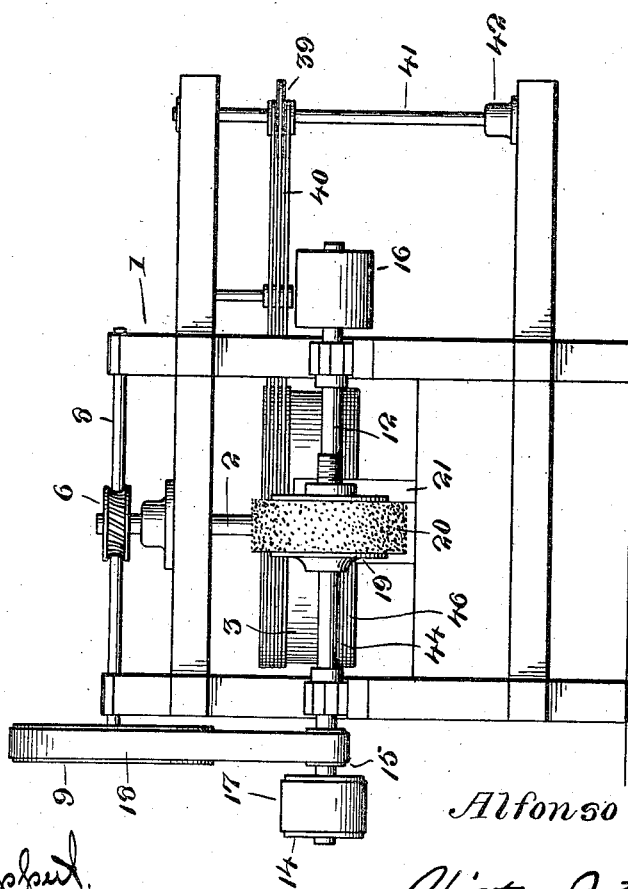
Inventor
Alfonso Aguilar
By Victor J. Evans
Attorney
Witnesses A. AGUILAR.
APPARATUS FOR CLEANING LECHUGUILLA, HENEQUEN, AND ANALOGOUS FIBROUS PLANTS.
APPLICATION FILED AUG. 30, 1916.
1,277,816.
Patented Sept. 3, 1918.
4 SHEETS—SHEET 4.
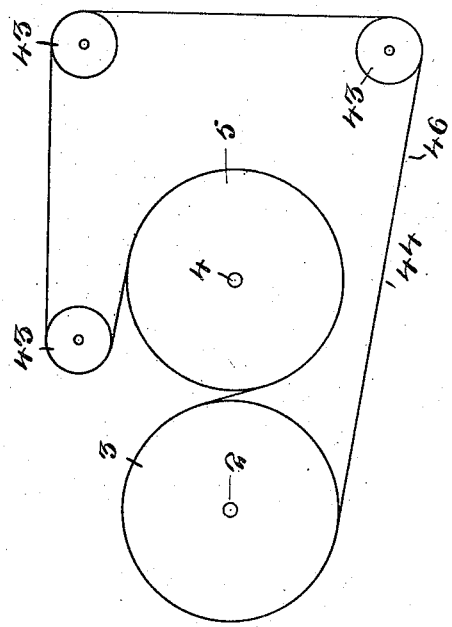
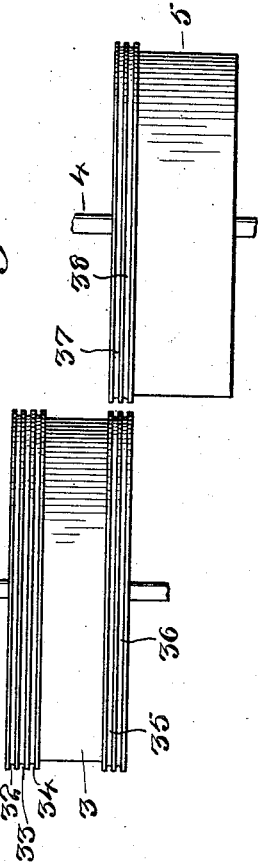
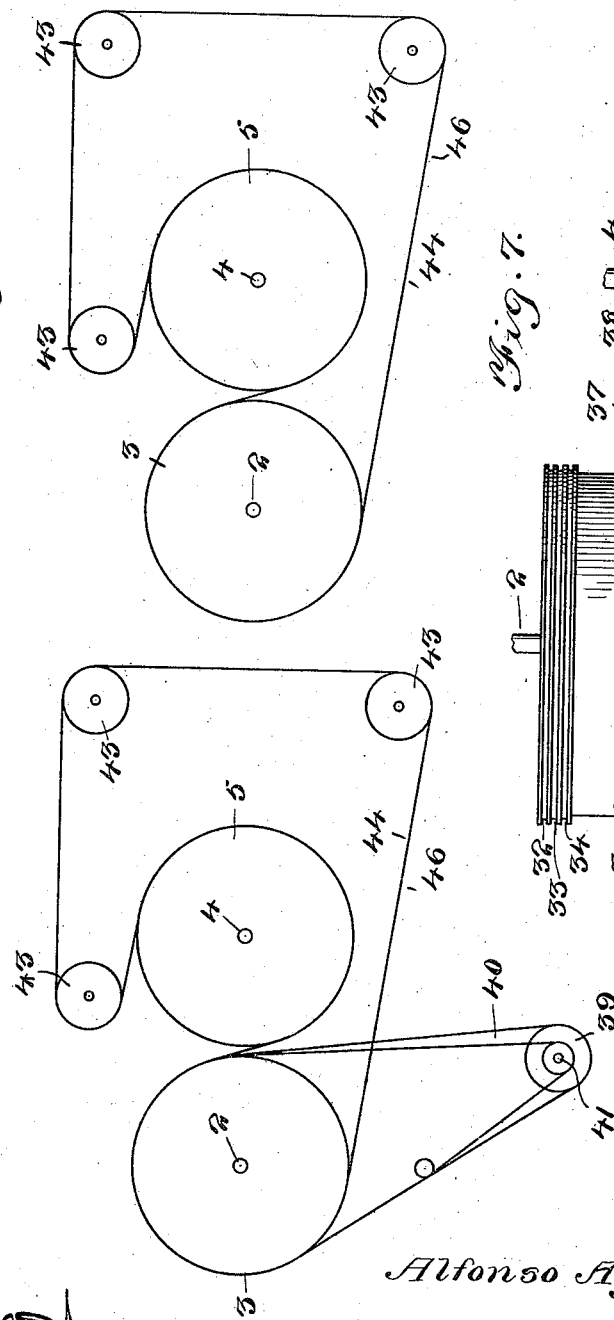
Inventor
Alfonso Aguilar
Witnesses
E. P. Ruppert.
John J. McCarthy
By Victor J. Evans
Attorney

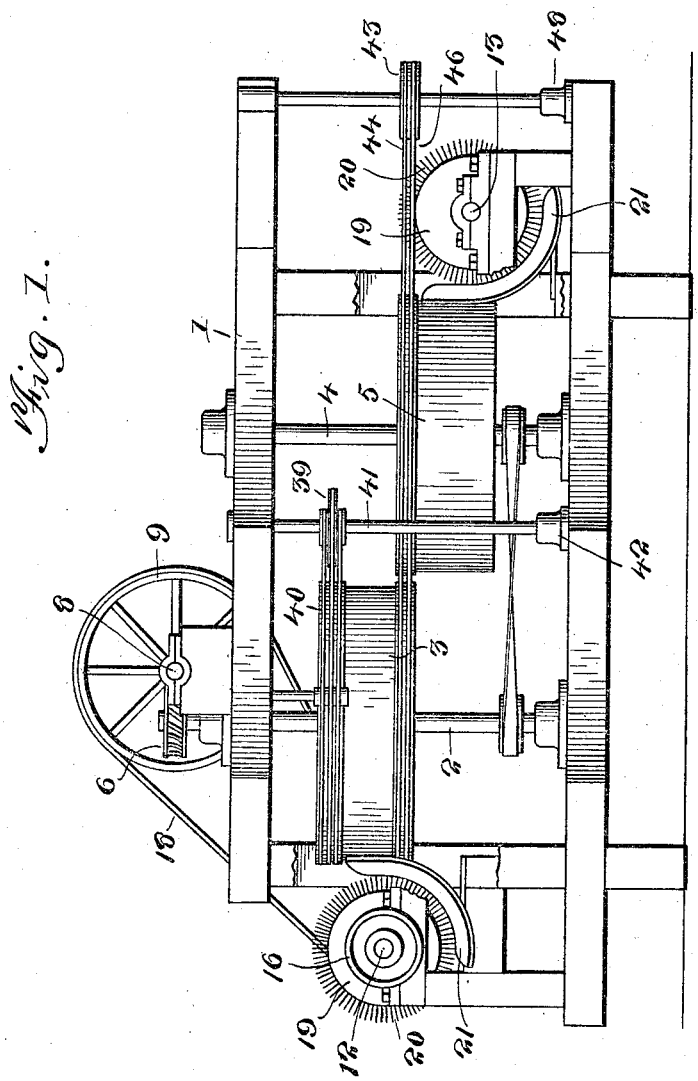

UNITED STATES PATENT OFFICE.

ALFONSO AGUILAR, OF EL PASO, TEXAS.

APPARATUS FOR CLEANING LECHUGUILLA, HENEQUEN, AND ANALOGOUS FIBROUS PLANTS.

1,277,816.     Specification of Letters Patent.     Patented Sept. 3, 1918.

Application filed August 30, 1916. Serial No. 117,730.

*To all whom it may concern:*

Be it known that I, ALFONSO AGUILAR, a citizen of the United States of Mexico, residing at El Paso, in the county of El Paso and State of Texas, have invented new and useful Improvements in Apparatus for Cleaning Lechuguilla, Henequen, and Analogous Fibrous Plants, of which the following is a specification.

This invention relates to an improved apparatus for scraping lechuguilla, henequen and analogous fibrous plants.

In carrying out the present invention, it is my purpose to provide an apparatus of the class described whereby the stalks of the plants may be scraped mechanically and the pulp separated from the fiber of the plant so that the fiber will be cleaned and ready for use.

With the above and other objects in view, the invention consists in the construction, combination and arrangement of parts hereinafter set forth in and falling within the scope of the claims.

In the accompanying drawings:

Figure 1 is a view in front elevation of a machine constructed in accordance with the present invention.

Fig. 2 is a top plan view of the same.

Fig. 3 is a view in side elevation thereof.

Fig. 4 is a diagrammatic view showing the manner in which the cables or cords are arranged.

Fig. 5 is a similar view.

Fig. 6 is a similar view.

Fig. 7 is an enlarged side elevation of the drums.

The manner or mode of treatment of the material consists in pounding the stalk of the plant into a substantially flat shape; then feeding the stalk to a moving element and subjecting one side of the stalk to the action of a scraper and then transporting the stalk to another moving element with the previously scraped side against such element and subjecting the other side of the stalk to the action of a scraper, thereby removing the pulp from the fiber and cleaning the latter so that the fiber may be used for its intended purpose.

In the accompanying drawings, I have shown one form of apparatus for carrying my improved method into practical use and in this connection I wish it to be understood that the construction of the apparatus may be changed without departing from the spirit of my invention or exceeding the scope of the claims.

Referring now to the drawings in detail, 1 designates a frame suitably constructed to support the mechanism of the apparatus illustrated in the drawings. Journaled in vertically alining bearings carried by the frame 1 is a vertical shaft 2 and surrounding the shaft 2 and fixed thereon is a cylindrical drum 3, while journaled in vertically alining bearings and arranged alongside of the shaft 2 is a vertical shaft 4 parallel with the shaft 2. Keyed upon the shaft 4 is a cylindrical drum 5 adapted to rotate in a direction reverse to the drum 3. Keyed upon the upper end of the shaft 2 is a worm wheel 6 meshing with a worm 7 fast upon the horizontal shaft 8 journaled in horizontally alining bearings carried by the upper end of the frame 1. Also fixed upon the shaft 8 is a belt pulley 9. The drum 3 is arranged in a plane above the drum 5 and the lower end portion of the drum 3 alines with the upper end portion of the drum 5, as clearly shown in Fig. 3 of the drawings. Journaled in horizontally alining bearings carried by the frame 1 and disposed contiguous to the outer portion of the respective drums 3 and 5 are transverse shafts 12 and 13 and fixed upon the corresponding ends of the shafts 12 and 13 are pulleys 14. Also fixed upon the shaft 12 is a belt pulley 15 arranged adjacent to the pulley 14, while fixed upon the outer end of the shaft 12 is a belt pulley 16 adapted to be belted up to a suitable source of power. Trained over the pulleys 14, 14 is a crossed belt 17 whereby the motion may be transmitted from the shaft 12 to the shaft 13 to rotate the shaft 13 in a direction reverse to the direction of rotation of the shaft 12. Trained over the belt pulleys 15 and 9 is a belt 18 whereby motion may be transmitted from the shaft 12 to the belt 8 to revolve the shaft 2 and the drum 3 thereon. Fixed upon each shaft 12, 13 is a cleaning or scraping device embodying, in the present instance, a drum 19 having the periphery thereof equipped with outwardly extending wire bristles 20 and mounted upon the frame between each cleaning device and the adjacent drum is a segmental supporting iron 21 that conforms to the curvature of the drum of the cleaning device.

Formed in the drum 3 adjacent to the upper end thereof are annular grooves 32, 33 and 34, while formed in the drum adjacent to the lower end thereof are annular grooves 35 and 36. Formed in the drum 5 adjacent to the upper end thereof are annular grooves 37 and 38 that aline with the grooves 35 and 36 respectively in the drum 3.

Trained through the grooves 32, 33 and 34 and over suitably arranged guide sheaves 39 corresponding to the grooves 32, 33 and 34 are endless ropes 40 or other flexible elements. These guide sheaves 39 are mounted upon a vertical shaft 41 journaled in alining bearings 42 carried by the frame 1 and the sheaves corresponding to the groove 33 is of greater diameter than the other sheaves so that the rope 40 in the groove 33 will engage in such groove at a point beyond the point of engagement of the ropes in the grooves 32 and 34, for a purpose which will presently appear. Trained through the groove 37 and the drum 5 in one direction and the groove 35 in the opposite direction and over sheaves 43 is an endless rope 44, while trained through the grooves 38 and 36 in the reverse direction and over sheaves 45 is an endless rope 46. These sheaves 43 and 45 are arranged side by side and mounted upon vertical shafts 47 journaled in alining bearings 48 carried by the supporting frame 1.

In practice, the stalk of lechuguilla, henequen or other fibrous plant is beaten or pounded into substantially flat shape and one end of the stalk placed between the rope 40 in the groove 33 and the ropes in the grooves 32 and 34 so that the stalk may be suspended along the side of the drum 3. Previous to this feeding of the stalk to the drum 3, the shaft 12 is set in motion by the belt pulley 16 and this motion is transmitted from the shaft 12 to the shafts 8 and 13 and upon the rotation of the shaft 8 motion is transmitted to the drum 3 and then to the drum 5 through the medium of the ropes 44 and 46. In the rotation of the drums 3 and 5, the stalks of the plants are carried onto the drum 3 and shaft around with the drum and as the stalks move around with the drum, such stalks pass slowly across the face of the iron 21 and in this movement of the stalks across the iron, the cleaning device, being in operation, scrapes the pulp from the fiber. In the continued rotation of the drum 3, the center rope 40, which is arranged upon the outer side of the upper end of the stalks, disengages each stalk as the latter passes between the drums 3 and 5, while the ropes 44 and 46 which are trained through the grooves in the drum 5 in a direction reverse from the movement of the center rope 40 in the drum 3, bind the lower ends of the stalks to the drum 5. As the stalk passes from between the drums 3 and 5, the upper end thereof is released and the stalk swings downwardly and is suspended from the ropes 44 and 46 and lies against the drum 5 and is carried around and across the face of the other iron 21 and scraped by the corresponding cleaning device, thereby removing the pulp from the other side of the stalk. When the stalks move out of the zone of the cleaning device adjacent to the drum 5, such stalks are released by the ropes 44 and 46 and are in a fibrous condition so that they may be used for the desired purpose.

While I have herein shown and described the preferred form of my invention by way of illustration, I wish it to be understood that I do not limit or confine myself to the precise details of construction herein described and delineated, as modification and variation may be made within the scope of the claims and without departing from the spirit of the invention.

I claim:

1. A fiber machine comprising a drum mounted on a vertical axis, a pulley spaced laterally from said drum, vertically spaced feed cables trained around said pulley and around the upper end of the drum for holding one end of cactus leaves or the like against the latter, means for cleaning the other ends of said leaves as they are carried around by the drum, a second drum mounted on a vertical axis adjacent to the first named drum, transfer cables trained partly around the circumference of the first drum, passing between said drums and then partly around the circumference of the second drum, said transfer cables being disposed beneath the aforesaid cables and being adapted to transfer the leaves from the first to the second drum and to hold the cleaned ends of said leaves against said second drum, and means for cleaning the other ends of said leaves as they are carried around by said second drum.

2. A fiber machine comprising a drum mounted on a vertical axis, a pulley spaced laterally from said drum and having its center of greater diameter than its ends, a trio of vertically spaced feed cables trained respectively around the ends and center of said pulley and around the upper end of the drum for holding one end of cactus leaves or the like against the latter, means for cleaning the other ends of said leaves as they are carried around by the drum, a second drum mounted on a vertical axis adjacent the first named drum and having its upper portion lying in the same plane as the lower portion of the first named drum, one or more transfer cables trained around approximately one-half of the circumference of the first drum, passing between said drums and then around half the circumference of the second drum, said cables being disposed beneath the aforesaid cables and being adapted to transfer the leaves from the first to the second drum and to hold the cleaned ends of said leaves against said second drum, and means for cleaning the other ends of said leaves as they are carried around by said second drum.

3. A fiber machine comprising a frame, a drum mounted thereon upon a vertical axis, a bracket extending laterally from said frame adjacent the upper end thereof, a pulley carried by said bracket and disposed on an upright axis, said pulley having its center of greater diameter than its ends, a trio of endless feed cables trained respectively around the center and ends of said pulley and also trained around the upper end of said drum for holding one end of cactus leaves and the like against the latter, a bucking plate over which the free ends of the leaves are carried by the drum, a rotary brush operating adjacent said bucking plate for cleaning said free ends, a second drum mounted on a vertical axis adjacent the first named drum and having its upper portion lying in the same plane as the lower portion of the first named drum, one or more endless transfer cables passing around approximately one-half of the circumference of the first drum below the other cables, passing between said drums and then around half of the circumference of the second drum for transferring the leaves from the first to the second drum and holding the cleaned ends of said leaves against said drum, a second bucking plate over which the uncleaned ends of the leaves are carried by the movement of the second drum, and a second cleaning brush operating adjacent this bucking plate for cleaning these ends.

In testimony whereof I affix my signature.

ALFONSO AGUILAR.

Copies of this patent may be obtained for five cents each, by addressing the "Commissioner of Patents, Washington, D. C."